(12) United States Patent
Yoshizawa et al.

(10) Patent No.: US 6,194,336 B1
(45) Date of Patent: *Feb. 27, 2001

(54) HIGHLY TOUGHENED ALUMINA SINTERED BODIES AND THEIR MANUFACTURING PROCESS

(75) Inventors: Yu-ichi Yoshizawa, Nagoya; Motohiro Toriyama; Syuzo Kanzaki, both of Kasugai, all of (JP)

(73) Assignee: Japan as represented by Director General of Agency of Industrial Science and Technology, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/095,156

(22) Filed: Jun. 10, 1998

(30) Foreign Application Priority Data

Jun. 12, 1997 (JP) ................................................... 9-172911

(51) Int. Cl.[7] .................................................. C04B 35/10
(52) U.S. Cl. ........................... 501/153; 501/127; 501/128
(58) Field of Search ................................ 501/127, 153, 501/128; 51/309

(56) References Cited

U.S. PATENT DOCUMENTS

| | | | | |
|---|---|---|---|---|
| 4,298,385 | * | 11/1981 | Claussen et al. | 501/153 |
| 4,429,051 | * | 1/1984 | Davidge et al. | 501/127 |
| 5,082,809 | * | 1/1992 | Hayashi | 501/153 |
| 5,215,551 | * | 6/1993 | Hatanaka et al. | 501/153 |
| 5,324,693 | * | 6/1994 | Matsuki et al. | 501/127 |
| 5,395,407 | * | 3/1995 | Cottringer et al. | 501/127 |
| 5,453,104 | * | 9/1995 | Schwabel | 501/127 |
| 5,599,756 | * | 2/1997 | Matsuo | 501/127 |
| 5,672,554 | * | 9/1997 | Mohri et al. | 501/127 |
| 5,686,366 | * | 11/1997 | Koyama et al. | 501/127 |
| 5,782,940 | * | 7/1998 | Jayan et al. | 501/153 |
| 5,866,491 | * | 2/1999 | Unno | 501/127 |

OTHER PUBLICATIONS

T. Furubayashi, et al., Kagaku Dojin Publishing House, pp. 35 to 59, "New Technologies for Advanced Materials: Development, Manufacture, Assessment", 1981 (no month).

Shuzo Kato, et al., Yogyo–Kyokai–Shi, vol. 85, No. 6, pp. 253 to 257, "Effects of Crystallinity of $NH_4AlO(OH)HCO_3$ on the Sinterability of $\alpha$–Alumina", 1977 (no month).

R. Morrell, National Physical Laboratory, Part 2, pp. 24, 25, 82, 101 and 102, "Handbook of Properties of Technical & Engineering Ceramics", 1987 (no month).

H. Okuda, et al., Ohm Publishing Company, pp. 12 to 15, "Structural Ceramic Materials", 1987 (no month).

Masaki Yasuoka, et al., Journal of the Ceramic Society of Japan, vol. 101, No. 8, pp. 889 to 894, "Effect of Dispersed Particle Size on Mechanical Properties of Alumina/Non–Oxides Composites", 1993 (no month).

Paul F. Becher, Journal of American Ceramic Society, vol. 74, No. 2, pp. 255 to 269, "Microstructural Design of Toughened Ceramics", 1991 (no month).

* cited by examiner

Primary Examiner—Michael Marcheschi
(74) Attorney, Agent, or Firm—Oblon, Spivak, McClelland, Maier & Neustadt, P.C.

(57) ABSTRACT

This invention relates to highly toughened alumina sintered bodies, and the highly toughened alumina sintered bodies are fabricated by sintering an $\alpha$-aluminum oxide powder which is obtained by employing an aluminum hydroxide produced by the Bayer's process as a starting material, and calcining at 900–1200° C. a mixture obtained by adding abrasion powder worn from pulverizing alumina balls or another product to the material, in an amount of 0.01–20 mass % as seed crystals for $\alpha$-aluminum oxide.

16 Claims, 1 Drawing Sheet

US 6,194,336 B1

HIGHLY TOUGHENED ALUMINA SINTERED BODIES AND THEIR MANUFACTURING PROCESS

BACKGROUND OF THE INVENTION

1. Field of the Invention

The present invention relates to highly toughened alumina sintered bodies and to a manufacturing method therefor, and more particularly to a novel method for manufacturing alumina sintered bodies in which abrasion powder and other byproducts worn from grinding media always brought about as contamination during the pulverization or grinding of starting powders are efficiently utilized, which allows the same low-temperature sintering as that achieved with highpurity, readily sinterable aluminum oxide powders to be applied to α-aluminum oxide powders fabricated using inexpensive aluminum hydroxide produced by the Bayer's process as a starting material, and which makes it possible to obtain alumina sintered bodies with high strength and fracture toughness; and relates to highly toughened alumina sintered bodies thus obtained.

The highly toughened alumina sintered bodies of the present invention can be used as a structural material or substrate material with high mechanical strength and reliability requirements.

2. Description of the Background

The following are examples of reports describing conventional alumina sintered bodies.

These examples include techniques in which several percent of silicon oxide, magnesium oxide, or other glass-forming compounds are added to an α-aluminum oxide powder fabricated by heating and pyrolyzing an aluminum hydroxide produced by the Bayer's process as a starting material, and sintered bodies are fabricated using a liquid phase formed at a high temperature; and techniques in which the aforementioned powder is pulverized into a fine powder, and solid-phase sintering is then performed without any additions or with an addition of a small amount of magnesium oxide (T. Furubayashi, K. Yamada, "New Technologies for Advanced Materials: Development, Manufacture, Assessment"; Edited by G. Adachi, K. Shibayama, and T. Minami, Kagaku Dojin Publishing House, Tokyo, 1981, pp. 35–59).

It has also been reported that highly toughened alumina sintered bodies can be obtained by low-temperature sintering through the use of a high-purity α-aluminum oxide powder fabricated without the use of the Bayer's process (S. Kato, T. Iga, "Effect of Crystallinity of $NH_4AlO(OH)HCO_3$ Matrix Salt on Sinterability of α-Alumina," Yogyo Kyokaishi, 85 (6) 253–257, 1977).

Such conventional alumina sintered bodies, however, have a fracture toughness of about 3.5 MPa·m$^{1/2}$. For example, a sintered body fabricated from a conventional high-purity, readily sinterable aluminum oxide powder is a material that has high strength but low fracture toughness (see, for example, R. Morrell, "Handbook of Properties of Technical & Engineering Ceramics. Part 2. Data Reviews. Section 1. High-alumina Ceramics," Her Majesty's Stationery Office. London, 1987; Edited by H. Okuda, T Hirai, and T. Kamijo, "Structural Ceramic Materials," Ohm Publishing Company, Tokyo, 1987; and M. Yasuoka, Manuel E. Brito, K. Hirao, and S. Kanzaki, "Effect of Dispersed Particle Diameter on Mechanical Properties of Alumina Containing Dispersed Non-oxide Particles," J. Ceram. Soc. Jpn., 101 (8), 889–894, 1993).

In addition, highly strengthened, highly toughened zirconia is expensive, has inferior mechanical characteristics due to the effect of low-temperature heating or atmosphere, and cannot be used in a wide variety of applications (see, for example, P. F. Bevher, "Microstructural Design of Toughened Ceramics," J. Am. Ceram. Soc., 74 (2), 255–69, 1991).

An urgent need therefore existed for developing inexpensive structural materials having high strength and high fracture toughness, and for developing alumina sintered bodies in particular.

In view of this situation, the inventors, in the course of a study on alumina sintered bodies, turned their attention to the efficient use of abrasion powder worn from grinding media for starting powders, and research extensively the effects on the properties of such alumina sintered bodies. As a result, the inventors perfected the present invention upon discovering that a structural material with high fracture toughness can be obtained by adding and sintering a prescribed proportion of abrasion powder worn from alumina balls or another product as seed crystals for α-aluminum oxide.

SUMMARY OF THE INVENTION

This invention provides highly toughened alumina sintered bodies and a manufacturing method therefor. The highly toughened alumina sintered bodies have a flexural strength of 300 MPa or higher, as measured in accordance with the three-point bending technique defined in JIS-R1601, and a fracture toughness of 5 MPa·m$^{1/2}$ or higher, as defined in accordance with JIS-R1607. This invention relates to highly toughened alumina sintered bodies, and the aforementioned highly toughened alumina sintered bodies are fabricated by sintering an α-aluminum oxide powder which is obtained by employing an aluminum hydroxide produced by the Bayer's process as a starting material, and calcining at 900–1200° C. a mixture obtained by adding abrasion powder worn from alumina balls or another product to the material, in an amount of 0.01–20 mass % as seed crystals for α-aluminum oxide.

Specifically, an object of the present invention is to provide highly toughened alumina sintered bodies and a manufacturing method therefor.

Another object of the present invention is to provide an inexpensive structural material with high strength and fracture toughness obtained using the aforementioned alumina sintered bodies.

The present invention, which is aimed at attaining the stated objects, resides in an alumina sintered bodies characterized by high toughness and fabricated by sintering an α-aluminum oxide powder which is obtained by employing an aluminum hydroxide produced by the Bayer's process as a starting material, and calcining at 900–1200° C. a mixture obtained by adding abrasion powder worn from pulverizing alumina balls or another type of fine α-aluminum oxide powder measuring 0.1 μm or less to the material, in an amount of 0.01–20 mass % as seed crystals for α-aluminum oxide.

In addition, the present invention resides in a highly toughened alumina sintered bodies characterized by having a flexural strength of 300 MPa or higher, as measured in accordance with the three-point bending technique defined in JIS-R1601, and a fracture toughness of 5 MPa·m$^{1/2}$ or higher, as defined in accordance with JIS-R1607.

The present invention also resides in a highly toughened alumina sintered body characterized in that the ratio of anisotropic crystal grains having a major axis of 10 μm or less and an aspect ratio of 2 or higher is 20 surface % or higher, as observed in a cross section of the sintered body.

Furthermore, the present invention resides in a method for manufacturing highly toughened alumina sintered bodies characterized in that comprises sintering an α-aluminum oxide powder which is obtained by employing an aluminum hydroxide produced by the Bayer's process as a starting material, and calcining at 900–1200° C. a mixture obtained by adding abrasion powder worn from pulverizing alumina balls or another type of fine α-aluminum oxide powder measuring 0.1 μm or less to the material, in an amount of 0.01–20 mass % as seed crystals for α-aluminum oxide.

DESCRIPTION OF THE PREFERRED EMBODIMENTS

Figure 1:
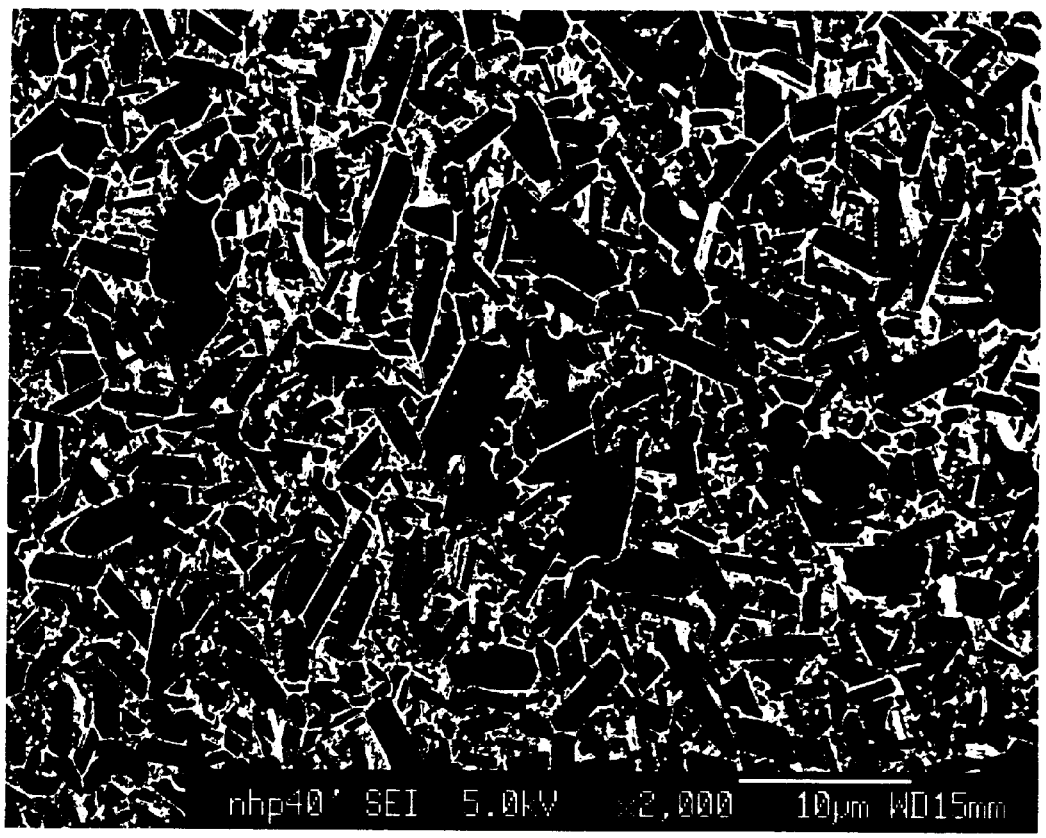
FIG. 1 is a scanning electron photomicrograph depicting the polished and etched surface of a cross section of the sintered body pertaining to Example 1 of the present invention.

The present invention will now be described in further detail.

It is common knowledge that adding α-aluminum oxide during the fabrication of α-aluminum oxide lowers the temperature of a phase transformation into α-aluminum oxide. A commonly added α-aluminum oxide powder, however, has a large particle diameter and is not sufficiently effective as a seed. The present invention makes it possible to dramatically lower the temperature of a phase transformation into α-aluminum oxide by uniformly adding fine α-aluminum oxide particles through efficient utilization of abrasion dust and other products of grinding media, which is always brought about as contamination during the pulverization or grinding of the starting powder.

Consequently, the same low-temperature sintering as that achieved with high-purity, readily sinterable aluminum oxide powders can be applied to α-aluminum oxide powders fabricated using inexpensive aluminum hydroxide produced by the Bayer's process as a starting material. As a result, dense sintered body devoid of abnormal grain growth can be obtained.

On the other hand, sintered body fabricated from conventional high-purity, readily sinterable aluminum oxide powders have high strength but low fracture toughness because they consist of equiaxial crystal grains. By contrast, it was discovered that the product of the present invention contains a large number of anisotropic crystal grains and exhibits very high fracture toughness due to the effect of the trace impurities present in the starting material.

The method of the present invention will now be described. An aluminum hydroxide produced by the Bayer's process is used as a starting material in the method of the present invention. With the exception of some commercially available high-purity aluminum oxide products, aluminum oxide powders of 99% or higher are fabricated using aluminum hydroxides produced by the Bayer's process as starting materials (see, for example, K. Yamada, "Alumina as Starting Material for Ceramics," Ceramics, 17 (10), 810–816, 1982). Thus, the method of the present invention also features the use of an aluminum hydroxide produced by the Bayer's process as a starting material.

The aforementioned aluminum hydroxide is pulverized, for example, for 10 minutes to 1000 hours using a nylon resin pot and high-purity aluminum oxide balls. Water, alcohol, or the like is used as the dispersion medium. As a result, abrasion powder worn from the pulverizing balls is admixed into the starting material. Another effect is that, for example, abrasion powder brought about in tumbling or another type of fine α-aluminum oxide worn from balls manufactured using aluminum oxide can be admixed as seed crystals to a slurried aluminum hydroxide.

Any abrasion powder or fine α-aluminum oxide powder measuring 0.1 μm or less can thus be used as the aforementioned abrasion powder or the like. Although abrasion powder worn from grinding media should preferably be used, it is also possible to use other types of fine α-aluminum oxide powder, such as the α-aluminum oxide powder produced in accordance with the present invention, or a product obtained by thoroughly pulverizing an existing powder and removing the fine fraction. It should be noted that the powders currently available on the market have particle diameters of 0.1 μm and greater, whereas abrasion powder, while varying with the conditions, is generally 0.05 μm (50 nm) or less.

In a preferred addition process, water or alcohol is used as a dispersion medium for the starting aluminum hydroxide, pulverization is performed using an aluminum oxide grinding medium, and uniform dispersion is performed simultaneously with the addition of abrasion powder. It is also possible to employ a process in which, for example, an aluminum oxide grinding medium and a dispersion medium alone are treated in a ball mill without the addition of a starting material, and the resulting abrasion powder brought about in tumbling or another product, such as the aforementioned fine α-aluminum oxide powder, is admixed into aluminum hydroxide made into a slurry using the dispersion medium.

The amount in which the powder is admixed into a sample should preferably be 0.01–20 mass %. It is unsuitable for the amount to fall below 0.01% or to exceed 20% because in the first case the seeding effect is inadequate, and in the second case higher costs result. The amount should be 0.01 mass % or less if finer seeds are to be obtained.

A finished α-aluminum oxide powder is subsequently obtained by drying the aforementioned mixture in an appropriate manner, preferably be keeping the mixture for 10 minutes to 10 hours at 900–1200° C. Any process may be used for such calcining as long as the aforementioned finished α-aluminum oxide powder can be obtained, and no particular restrictions are imposed on the conditions or other parameters of the process.

The α-aluminum oxide powder thus obtained is sintered at normal pressure or pressed under heating, yielding an alumina sintered body. For example, the powder may be hot-pressed for 1 hour at a temperature of 1300–1400° C. and a pressure of 40 MPa in a vacuum.

Examples of suitable sintering conditions include a temperature of 1350–1500° C. and a duration of 2 hours in the case of normal-pressure sintering, and a temperature of 1300–1450° C. and a duration of 1 hour in the case of hot pressing.

The method of the present invention makes it possible to dramatically lower the temperature of a phase transformation into α-aluminum oxide from 1300° C. or higher to 1100° C. or lower, and to manufacture a dense sintered body devoid of abnormal grain growth, by adding grinding-medium abrasion powder or another type of fine α-aluminum oxide particles measuring 0.1 μm or less. In addition, the product contains large amounts of anisotropic crystal grains due to the effect of the silicon oxide, sodium oxide, calcium oxide, and other trace impurities contained in the starting material. In other words, anisotropic crystal grains having a major axis of 10 μm or less and an aspect ratio of 2 or higher are contained in a proportion of 20 surface % or higher. As a result, it is possible to obtain a highly strengthened, highly toughened alumina sintered body that has a flexural strength of 300 MPa or higher, as measured in accordance with the three-point bending technique defined in JIS-R1601, and a fracture toughness of 5 MPa·m$^{1/2}$ or higher, as defined in accordance with JIS-R1607.

No reports are as yet available concerning techniques for obtaining such high fracture toughness through the use of an inexpensive aluminum oxide produced by the Bayer's process as a starting material.

EXAMPLES

The present invention will now be described in detail on the basis of working examples. The present invention is not limited by these examples, however.

Examples (1) α-Aluminum Oxide Powder

Aluminum hydroxide of commercial-grade purity with a mean particle diameter of 0.6 μm was pulverized for 128 hours using a nylon resin pot and high-purity alumina balls with a diameter of 5 mm. Distilled water was used as the dispersion medium. Abrasion powder worn from the balls during pulverization was admixed into the sample in an amount of 2.3 mass %. A finished α-aluminum oxide powder was obtained by keeping the dried pulverization product for 2 hours at 1100° C.

(2) Alumina Sintered Bodies

The powder thus obtained was introduced into a carbon die measuring 42×47 mm and held in vacuum for 1 hour at 1300° C. (Example 1) or 1400° C. (Example 2) while a pressure of 40 MPa was applied in the vertical direction of the die. A high-purity aluminum oxide powder (Comparison 1) and a low-soda, readily sinterable aluminum oxide powder (Comparison 2) were sintered under the same sintering conditions and used as comparison materials.

(3) Comparison Tests

Test pieces measuring 3×4×40 mm were subsequently cut from the sintered plates, the test pieces were polished, three-point strength was measured in accordance with JIS-R1601, and fracture toughness was measured in accordance with JIS-R1607.

In addition, the test pieces were first mirror-polished and then corroded under heating, and the appearance of the aluminum oxide particles on the polished surface was photographed by SEM over a surface area of 0.4 mm². Surface ratio (%) was defined as the ratio of the total surface area occupied by anisotropic crystal grains having a major axis of 10 μm or less and an aspect ratio of 2 or higher in relation to the surface area of the field of view.

The results are summarized in Table 1.

TABLE 1

| | Sintering temperature (° C.) | Density (g/cm³) | Strength (MPa) | Fracture toughness (MPa·m$^{1/2}$) | Ratio of particles measuring 10 μm or less and having an aspect ratio of 2 or greater |
|---|---|---|---|---|---|
| Comparison 1 | 1300 | 3.95 | 604 | 3.37 | 0 |
| Comparison 2 | 1400 | 3.92 | 526 | 3.39 | 4 |
| Example 1 | 1300 | 3.93 | 690 | 5.80 | 22 |
| Example 2 | 1400 | 3.94 | 421 | 7.57 | 73 |

It can be seen in the table that an aluminum oxide sinter having a strength of 400 MPa or higher and a fracture toughness of 5 MPa·m$^{1/2}$ or higher can be obtained.

In addition, observations of polished and etched surfaces of cross sections of sintered bodies under a scanning electron microscope revealed that anisotropic crystal grains having a major axis of 10 μm or less and an aspect ratio of 2 or higher have a ratio of 20 surface % or higher (FIG. 1).

As described in detail above, the present invention relates to alumina sintered bodies characterized by high toughness and fabricated by sintering an α-aluminum oxide powder which is obtained by employing an aluminum hydroxide produced by the Bayer's process as a starting material, and calcining at 900–1200° C. a mixture obtained by adding abrasion powder worn from pulverizing alumina balls or another type of α-aluminum oxide powder to the material, in an amount of 0.01–20 mass % as seed crystals; and to a manufacturing method therefor. The present invention allows alumina sintered bodies with high strength and fracture toughness to be manufactured using an inexpensive aluminum hydroxide produced by the Bayer's process as a starting material.

The highly toughened alumina sintered bodies of the present invention can be used as a structural material, substrate material, or other material with high mechanical strength and reliability requirements.

What is claimed is:

1. A toughened alumina sintered body, consisting essentially of alumina and trace impurities, and having a flexural strength of 300 MPa or higher and a fracture toughness of 5 MPa·m$^{1/2}$ or higher, which is fabricated by:

a) adding an abrasion powder, comprising α-aluminum oxide powder having a size of 0.1 μm or less, to a material comprising aluminum hydroxide containing trace impurities, in an amount of 0.01 to 20 mass % as seed crystals for α-aluminum oxide powder;

b) calcining the mixture obtained in step a) at a temperature of 900° to 1,200° C. to obtain an α-aluminum oxide powder; and c) sintering the α-aluminum oxide powder obtained in step (b) to produce a sinter;

and wherein the surface of the toughened alumina sintered body contains at least 20 surface % of anisotropic crystal grains having a major axis of 10 μm or less, and an aspect ratio of 2 or higher.

2. The toughened alumina sintered body of claim 1, wherein said trace impurities in said aluminum hydroxide in step a) comprise silicon oxide, sodium oxide, or calcium oxide.

3. The toughened alumina sintered body of claim 1, wherein said abrasion powder in step a) has a size of 0.05 μm or less.

4. The toughened alumina sintered body of claim 1, wherein said sintering is accomplished at a temperature of 1,350° to 1,500° C.

5. The toughened alumina sintered body of claim 1, wherein said sintering is accomplished by hot pressing at a temperature of 1,300° to 1,450° C.

6. The toughened alumina sintered body of claim 1, having a flexural strength of 400 MPa or higher.

7. The toughened alumina sintered body of claim 1, having a flexural strength of from 421 to 690 MPa, and a fracture toughness of from 5.80 to 7.57 MPa·m$^{1/2}$.

8. The toughened alumina sintered body of claim 1, containing from 22 to 73 surface % of said anisotropic crystal grains.

9. A method for producing a toughened alumina sintered body, consisting essentially of alumina and trace impurities, and having a flexural strength of 300 MPa or higher and a fracture toughness of 5 MPa·m½ or higher, which comprises:

a) adding an abrasion powder, comprising α-aluminum oxide powder having a size of 0.1 μm or less, to a material comprising aluminum hydroxide containing trace impurities in an amount of 0.01 to 20 mass % as seed crystals for α-aluminum oxide powder;

b) calcining the mixture obtained in step a) at a temperature of 900° to 1,200° C. to obtain an α-aluminum oxide powder; and c) sintering the α-aluminum oxide powder obtained in step b) to produce a sinter;

and wherein the surface of the toughened alumina sintered body contains at least 20 surface % of anisotropic crystal grains having a major axis of 10 μm or less, and an aspect ratio of 2 or higher.

10. The method of claim 9, wherein said trace impurities in said aluminum hydroxide in step a) comprise silicon oxide, sodium oxide, or calcium oxide.

11. The method of claim 9, wherein said abrasion powder in step a) has a size of 0.05 μm or less.

12. The method of claim 9, wherein said sintering is accomplished at a temperature of 1,350° to 1,500° C.

13. The method of claim 9, wherein said sintering is accomplished by hot pressing at a temperature of 1,300° to 1,450° C.

14. The method of claim 9, wherein the toughened alumina sintered body has a flexural strength of 400 MPa or higher.

15. The method of claim 9, wherein the toughened alumina sintered body has a flexural strength of from 421 to 690 MPa, and a fracture toughness of from 5.80 to 7.57 MPa·m$^{1/2}$.

16. The method of claim 9, wherein the toughened alumina sintered body contains from 22 to 73 surface % of said anisotropic crystal grains.

* * * * *